(12) United States Patent  
Resare et al.

(10) Patent No.: US 8,479,790 B2
(45) Date of Patent: *Jul. 9, 2013

(54) HUB BORE MOUNTED CENTRAL TIRE INFLATION VALVE SYSTEM

(75) Inventors: Lars Johan Resare, Ewing, NJ (US); Michael G. Hartman, Lansdale, PA (US); Larry K. Rogers, Bordentown, NJ (US)

(73) Assignee: Hutchinson, S.A., Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/310,828

(22) Filed: Dec. 5, 2011

(65) Prior Publication Data

US 2012/0138202 A1 Jun. 7, 2012

Related U.S. Application Data

(63) Continuation of application No. 12/317,778, filed on Dec. 29, 2008, now Pat. No. 8,069,890.

(60) Provisional application No. 61/125,557, filed on Apr. 25, 2008.

(51) Int. Cl.
*B60C 23/10* (2006.01)

(52) U.S. Cl.
USPC .......................................... 152/417; 152/416

(58) Field of Classification Search
USPC ................................................ 152/415–417
See application file for complete search history.

(56) References Cited

U.S. PATENT DOCUMENTS

| 839,626 | A | 12/1906 | Nielsen |
| 4,883,106 | A | 11/1989 | Schultz et al. |
| 5,221,381 | A | 6/1993 | Hurrell, II |
| 5,979,526 | A | 11/1999 | Chamoy |
| 6,474,383 | B1 | 11/2002 | Howald et al. |
| 8,069,890 | B2 * | 12/2011 | Resare et al. ................. 152/417 |
| 2005/0205182 | A1 | 9/2005 | Maguaire et al. |
| 2009/0000716 | A1 | 1/2009 | Isono |

FOREIGN PATENT DOCUMENTS

| EP | 1262340 | 3/2008 |
| GB | 2178705 | 2/1987 |
| JP | 361169304 | 7/1986 |

* cited by examiner

*Primary Examiner* — Jason Bellinger
(74) *Attorney, Agent, or Firm* — Reed Smith LLP

(57) ABSTRACT

A central tire inflation system. The system includes a central tire inflation valve and a hub bore manifold. The hub bore manifold is connected to and surrounds the central tire inflation valve. The hub bore manifold defines first and second air passageways which are in communication with the central tire inflation valve. The hub bore manifold is configured for removable connection to a hub of a vehicle and is also configured to fit within a central opening of a wheel of the vehicle.

20 Claims, 9 Drawing Sheets

HUB BORE MOUNTED CENTRAL TIRE INFLATION VALVE SYSTEM

CROSS-REFERENCE TO RELATED APPLICATIONS

This application is a continuation of, and claims the benefit under 35 U.S.C. §120 of the earlier filing date of, U.S. patent application Ser. No. 12/317,778 filed on Dec. 29, 2008 (now U.S. Pat. No. 8,069,890), which claims the benefit under 35 U.S.C. §119(e) of the earlier filing date of U.S. Provisional Patent Application No. 61/125,557 filed on Apr. 25, 2008, the contents of which are incorporated herein by reference in their entirety.

BACKGROUND

This invention is a system and apparatus for installing a central tire inflation (CTI) valve in a wheel hub bore.

FIG. 1 provides an example of a one-piece wheel assembly 1 with a hose fitting 2 mounted to the vehicle hub (not shown) in accordance with the teachings of prior art. The one-piece wheel assembly 1 includes a wheel 3 with tire 4. Parts of wheel 3 include rim portion 5, transverse wall or "disc" portion 6, drop center area 7, an air duct formed by airway 8, and a central opening, hub bore area 9. Hose fitting 2 connects to an air hose 10; the air hose 10 connects to the wheel 3 via another hose fitting 11. The tire 4 and rim 5 form a tire chamber 12 that contains a pressurized fluid (usually air).

Similarly, FIG. 2 shows a section of a two-piece wheel assembly 13 configured for an externally mounted CTI valve 15 and a quick release valve 14 mounted on a two-piece wheel 16 in accordance with prior art. The two-piece wheel assembly 13 includes the two-piece wheel 16 and tire 4. Parts of wheel 16 include rim portion 5, disc portion 6, rim flat area 17, and a central opening (hub bore area 9). The tire 4 and rim 5 form a tire air chamber 12 that contains a pressurized fluid (usually air). Two-piece wheels 16 are usually used when a bead lock 18 or run flat device (not shown) are utilized in the two-piece wheel assembly 13. Two-piece wheels 16 consist of two major parts, the inner rim half 19 and outer rim half 20. The two rim halves 19 and 20 are sealed with an o-ring 21 to prevent air from escaping out of tire air chamber 12. Bolts 22 and nuts 23 hold the two rim halves 19 and 20 together.

Finally, FIG. 3 shows a section of another two-piece wheel assembly 24 configured for an integrated CTI valve 25 attached to the wheel. The configuration shown is the same as in FIG. 2, except the CTI valve 25 uses an airway 26 from the vehicle hub (not shown) to the CTI valve 25 and an air duct formed by airway 27 from the CTI valve 25 to the tire cavity 12. (The CTI arrangement and internal passageways 26 and 27 are patented under U.S. Pat. No. 6,474,383 and European Patent EP 1 262 340 A2).

As the preceding figures illustrate, current CTI valve technology may employ any one of several air passageway configurations. Thus, as illustrated in FIG. 1, a hose fitting 2 mounted on the vehicle hub (not shown) can bring air through a hose 10 to a hose fitting on the wheel 11. Alternatively, as illustrated in FIG. 2, a hose fitting 28 on the vehicle hub (not shown) can bring air through a CTI air hose 29 to a quick release valve 14 mounted on the wheel 16. Another CTI air hose 30 channels air from the quick release valve 14 to the external CTI valve 15, while CTI air hose 31 brings air from the external CTI valve 15 to a sealed hose fitting 32 on the wheel 16. Finally, as illustrated in FIG. 3, an integrated CTI valve 25 can be mounted on the wheel 16. An airway 26 in the wheel brings air from a port on the vehicle hub (not shown) to the integrated CTI valve 25. A second airway 27 in the wheel brings air from the integrated CTI valve 25 to the tire cavity 12. (Cf., U.S. Pat. No. 6,474,383 and European Patent EP 1 262 340 A2). In all of these examples, the systems described allow the tire cavity 12 to be inflated or deflated via a control system in the vehicle as necessary to facilitate and optimize vehicle operation and performance.

However, all of the aforesaid methods and apparatus have disadvantages. These disadvantages include the fact that: (a) rocks, curbs, or brush can damage externally mounted valve configurations with hoses during vehicle operations; (b) rocks, curbs, or brush can damage integrated CTI valves mounted on the face of the wheel during vehicle operations; (c) both externally mounted and integrated CTI valves are "bulky" and take up a lot of space on the wheel face; (d) both externally mounted and integrated CTI vales require the airway in the wheel to be aligned with the airway in the vehicle hub; (e) externally mounted CTI valves with hoses and fittings typically contain a high number of components; (f) externally mounted CTI valves with hoses and fittings are complex and difficult to assemble; (g) externally mounted CTI valves and hoses result in excessive weight and increased wheel imbalance; (h) externally mounted CTI valves are highly visible and are more susceptible to damage from hostile fire (on military wheels) or sabotage by cutting the external tubing; (i) externally mounted CTI valves contain a higher number of components resulting in an increased number of leakage points; (j) externally mounted CTI valves contain a higher number of components results in increased cost; (k) externally mounted CTI valves contain a higher number of components resulting in increased time required to assemble and disassemble; (l) hose fittings can be easily stripped or damaged during assembly/disassembly; (m) integrated CTI valves mounted towards the rim portion of the wheel result in significant wheel imbalance and increased weight due to the counter balance weight required; and (n) as illustrated in FIG. 4, some CTI valves require heavy covers 33 for protection, further exacerbating several of the problems previously described.

SUMMARY

As previously noted, the purpose of this invention is to avoid the disadvantages of prior art by integrating a CTI valve containing member into the hub bore opening of a wheel so as to be in communication with the air passageway in the vehicle hub. In practice, this can advantageously be accomplished by mounting the CTI valve in and to a hub bore manifold which is mounted to the wheel disc or the vehicle hub. In the preferred embodiments illustrated, the hub bore manifold seals against the vehicle hub and the wheel hub bore surface (and/or the front face of the wheel disc) when tightened down on the disc or hub, and air travels from the vehicle hub to and from the tire cavity by way of internal air passageways.

The hub mounted central tire inflation system taught herein, as initially illustrated in FIG. 5, allows numerous advantages to be realized. First, with the integrated CTI valve 25 installed at the center of the wheel 16 and hub bore 9, recessed within the hub bore manifold 35, the integrated CTI valves 25 recessed in the hub bore manifold 35 are protected from damage caused by rocks, curbs, brush or sabotage. Second, integrated CTI valves 25 installed in a hub bore manifold 35 allow for the wheel assembly 34 to be installed on the vehicle in any orientation. Due to central CTI valve installation, alignment of wheel and vehicle hub airways is not required. Third, integrated CTI valves 25 installed in the hub bore manifold 35 reduce the number of components needed resulting in decreased complexity, cost, and time required to assemble/disassemble. Fourth, integrated CTI valves 25 installed in the hub bore manifold 35 eliminate the need for counter-balance weights to address the imbalance caused by 'bulky' CTI valves 25 and associated hardware, resulting in reduced wheel weight. Fifth, integrated CTI valves 25 installed in the centrally located hub bore manifold 35 reduce the amount of mass positioned away from the wheel axis of rotation, resulting in decreased moment of inertia and wheel assembly imbalance. Sixth, integrated CTI valves 25 installed in the hub bore manifold 35 eliminate the need for hoses and fittings. Seventh, if mounted as shown in FIG. 5, integrated CTI valves 25 installed in the hub bore manifold 35 allow for the whole wheel assembly, including the hub bore manifold 35 with integrated CTI valve 25, to be removed from the vehicle without removing hoses or fittings. Eighth, and finally, if mounted as shown in FIG. 9, then integrated CTI valves 25 installed in the hub bore manifold 35 allow for the option of removing the wheel assembly while the CTI valve 25 and hub bore manifold 35 remain installed on the vehicle hub 48.

DETAILED DESCRIPTION

Figure 1:
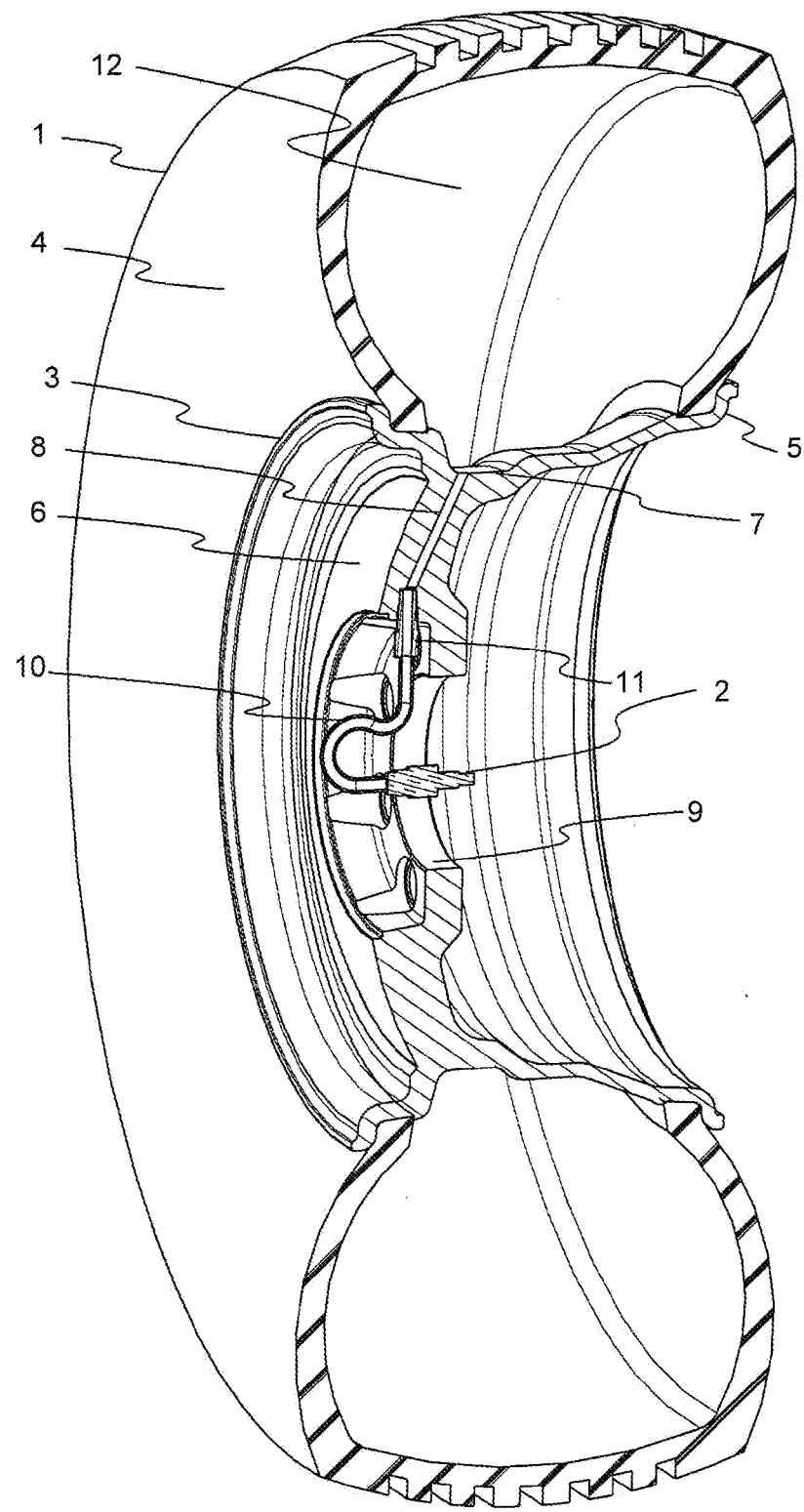
FIG. 1 provides a perspective view of a section of a one-piece wheel assembly with a hose fitting mounted to the vehicle hub in accordance with the teachings of prior art.
Figure 2:
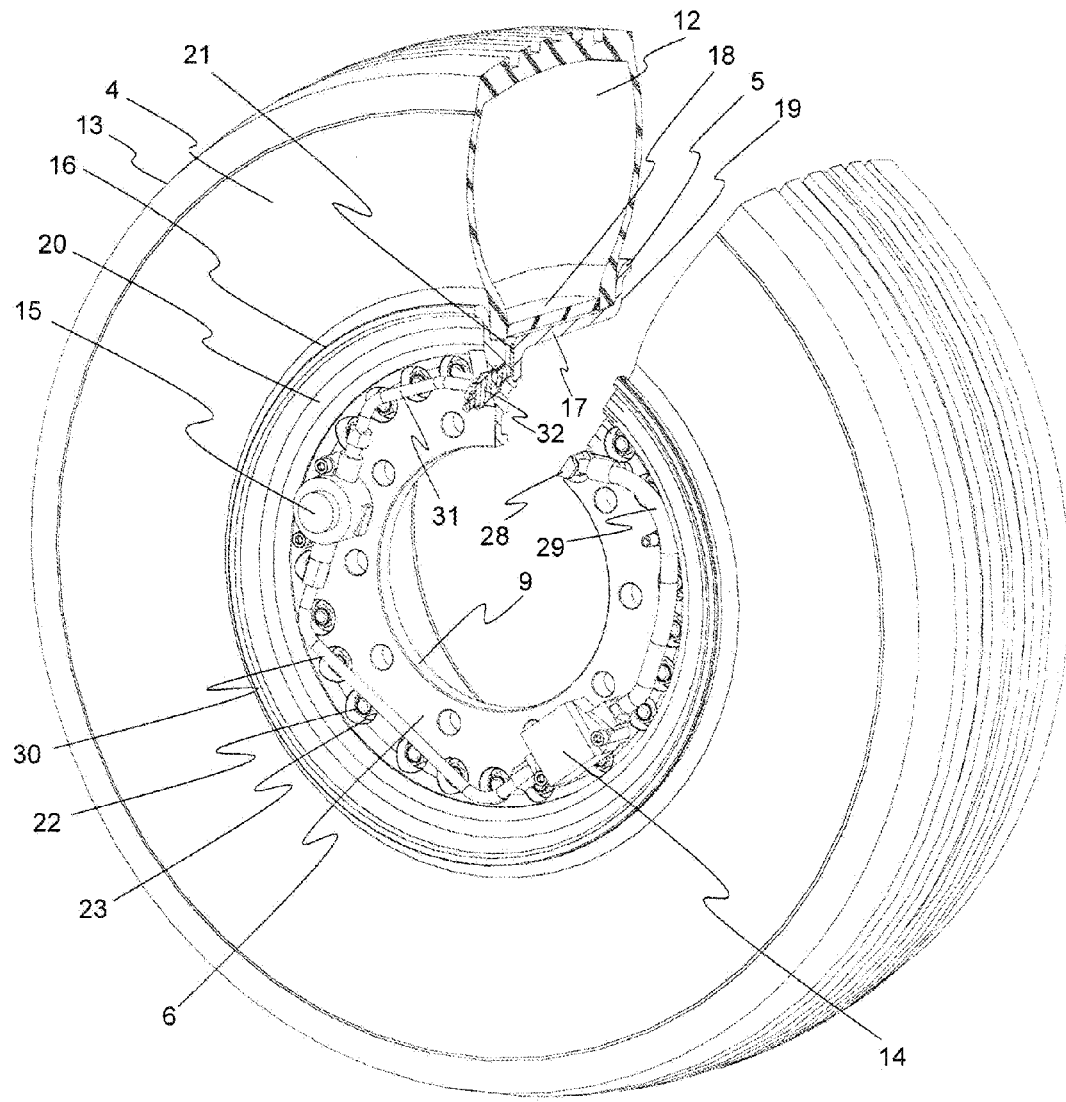
FIG. 2 provides a perspective view of a section of a two-piece wheel assembly configured for an externally mounted CTI valve and a quick release valve in accordance with prior art.
Figure 3:
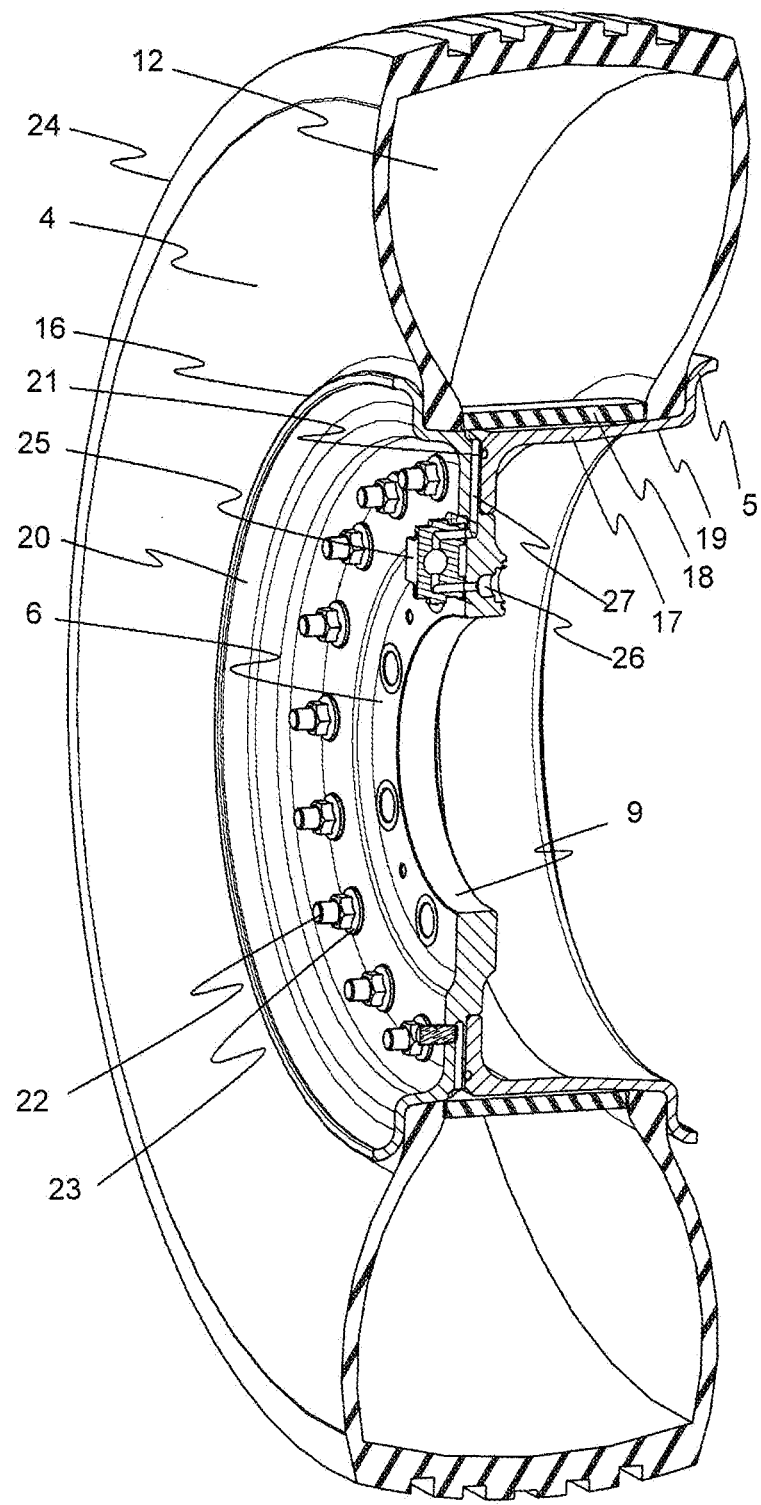
FIG. 3 provides a perspective view of a section of a two-piece wheel assembly configured for an integrated CTI valve in accordance with prior art.
Figure 4:
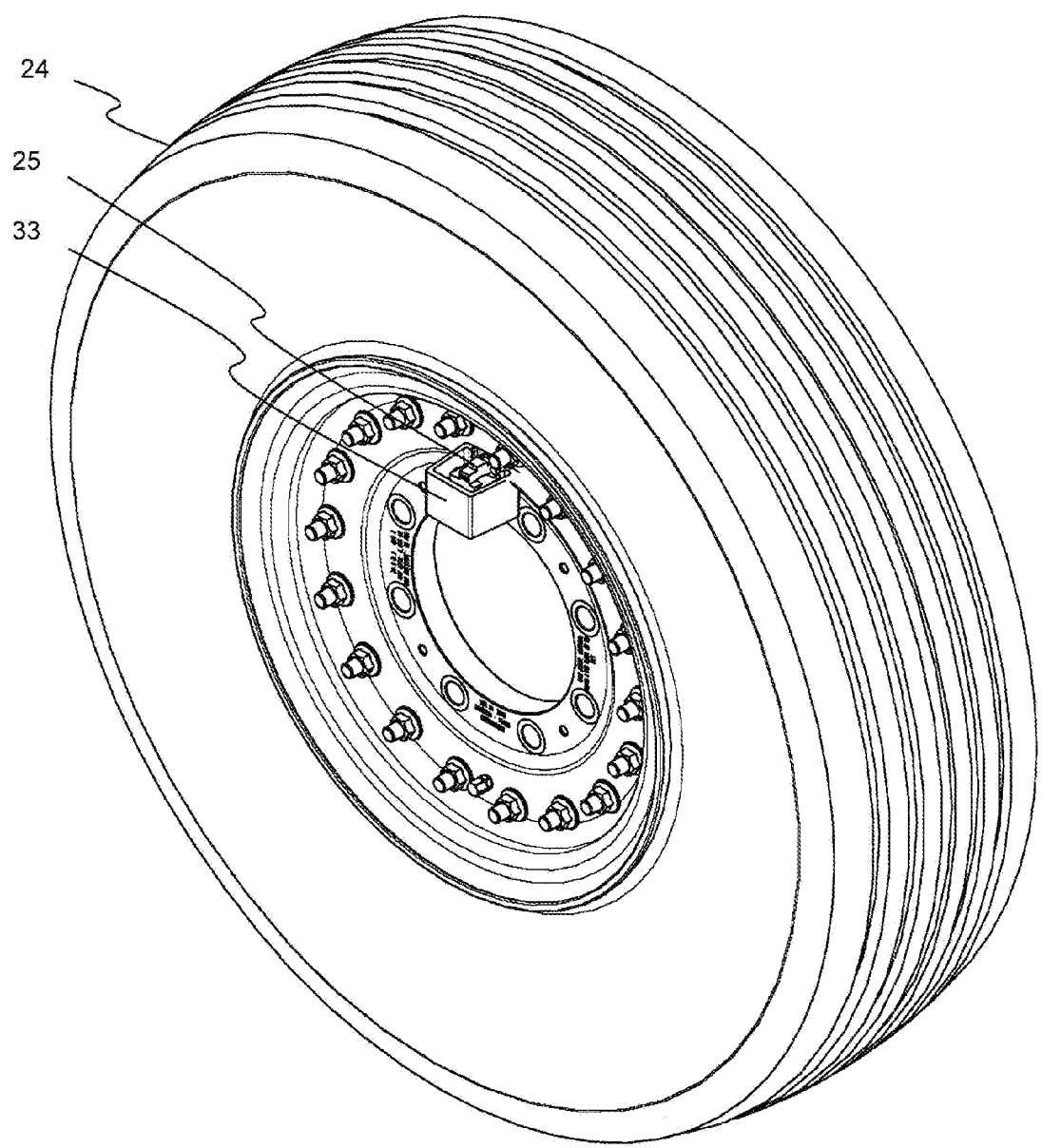
FIG. 4 provides a perspective view of a two-piece wheel assembly illustrating a heavy protective cover for a CTI valve in accordance with prior art.
Figure 5:
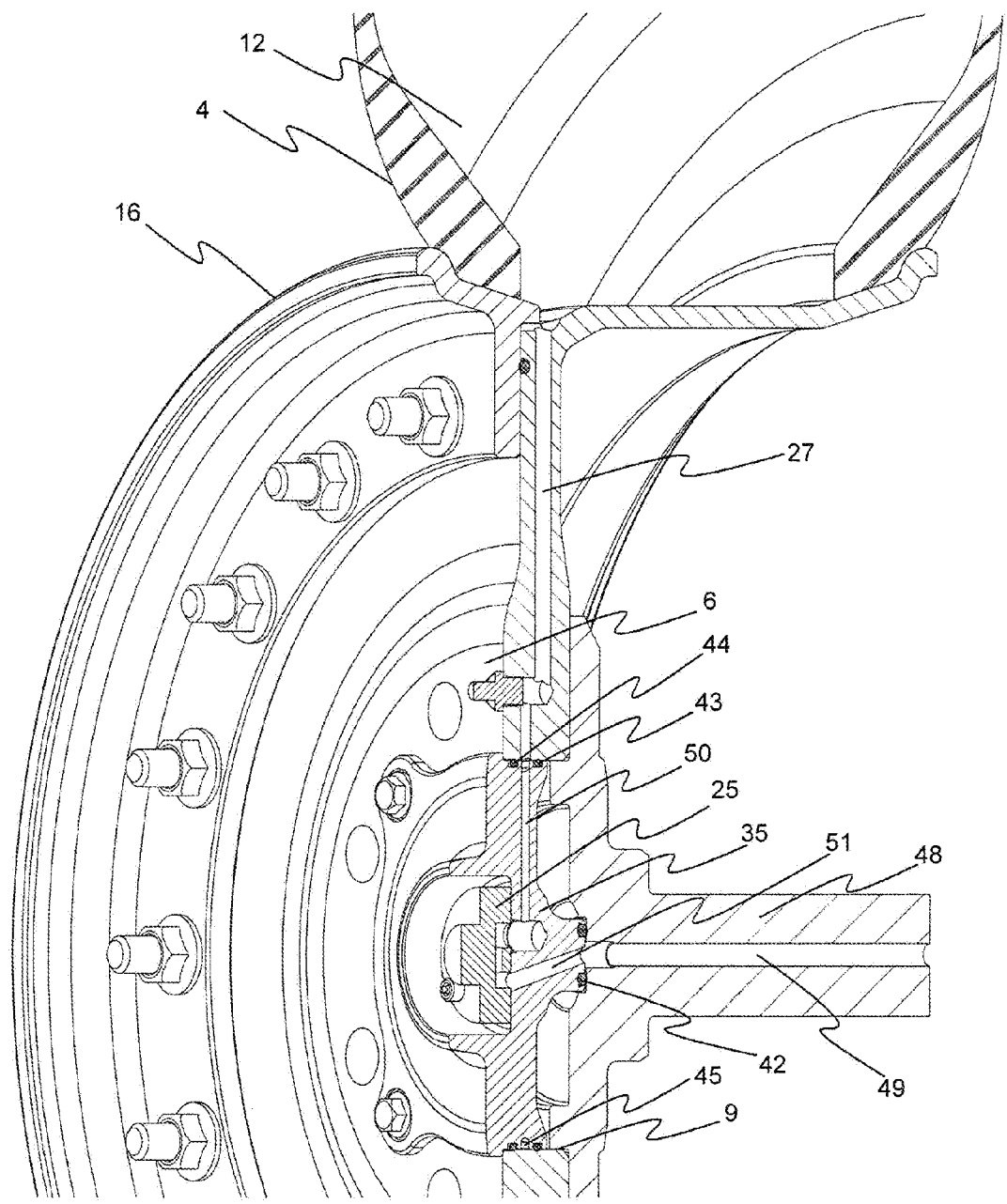
FIG. 5 provides a perspective view of a section of a two piece wheel illustrating a preferred embodiment of the invention featuring its characteristic integrated CTI valve and hub bore manifold installed at the center of a wheel and hub bore.
Figure 6:
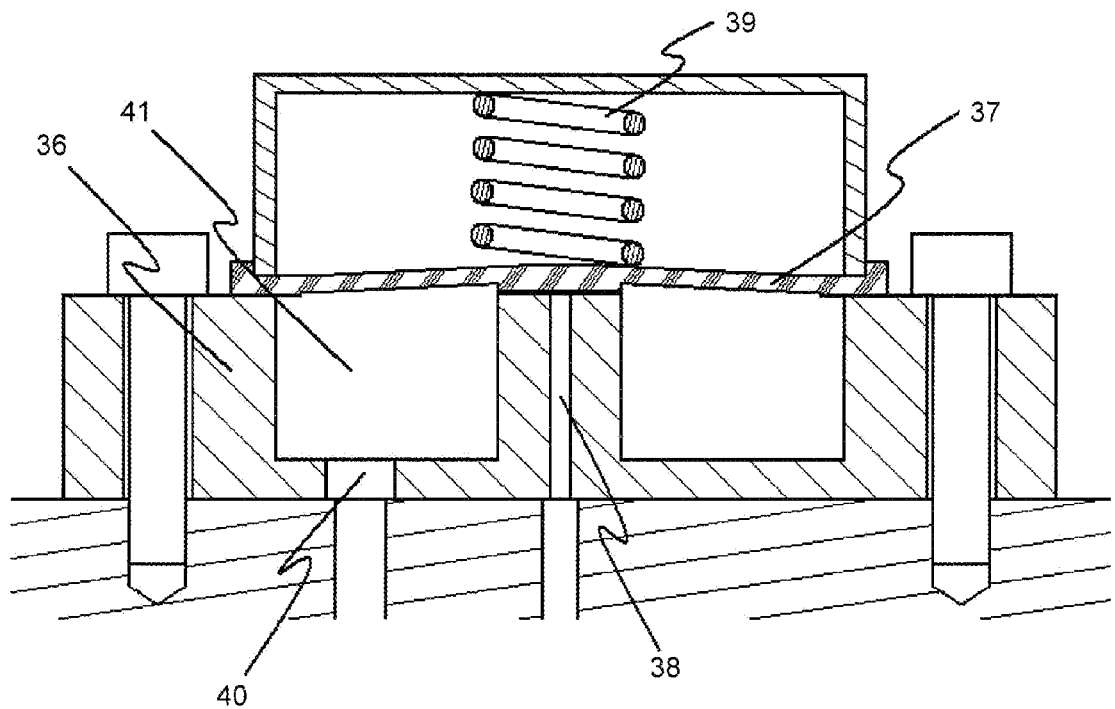
FIG. 6 provides a schematic cross-sectional of a generic CTI valve in accordance with prior art.

A typical central tire inflation valve ("CTI" or "CTI valve"), as illustrated generically in FIG. 6, features a valve body 36 with a diaphragm 37 held against the tire port airway 38 via a preloaded spring 39. A hub port 40 allows air to flow into the valve chamber 41. The increased pressure pushes against the diaphragm 37 and spring 39. As the diaphragm 37 and spring 39 are displaced, the tire port airway 38 is opened and air can flow from the hub port airway 40 to the tire port airway 38. However, other CTI valve designs can be used without affecting the scope and spirit of the invention, as initially illustrated in FIG. 5.

In our invention, a centrally mounted CTI valve member is preferably formed by integrating a CTI valve 25 in a hub bore manifold 35. The hub bore manifold 35 is assembled onto the wheel disc 6 and hub bore 9. An o-ring 42 seals the interface between the vehicle hub port 49 and the hub bore manifold 35 when the wheel disc 6 is mounted to the vehicle hub 48. O-rings 43 and 44 seal the interface between the hub bore manifold 35 and the wheel hub bore 9. Air flows from the vehicle hub port 49 to the hub bore manifold 35 by way of internal air passage ways, such as hub port connecting internal air passageway 51 ("hub port connector 51"). By way of additional internal air passage ways, such as air duct connecting internal air passageway 50 ("air duct connector" 50) and circumferential groove 45, air travels to the wheel's internal air passage ways (air ducts 27) from CTI valve 25. Finally, air passageway or air duct 27 in the wheel disc 6 allows airflow from the hub bore manifold 35 to the tire cavity 12.

It should be noted that the circumferential groove or channel 45 around the periphery of hub bore manifold 35 (or, alternatively, the periphery of hub bore area 9) is arranged to interface with air ducts 27 so as to eliminate the need for airway alignment between the wheel disc 6 and hub bore manifold 35 as well as the wheel assembly 34 and vehicle hub 48. This groove 45 need not be totally circumferential and, in fact, could only form a partial arc around the periphery of the wheel in order to simplify alignment issues. Alternatively, interfacing members can be added to wheel disc 6 and hub bore manifold 35 so as to force proper alignment between these two elements in or before affixing the hub bore manifold in position.

Figure 7:
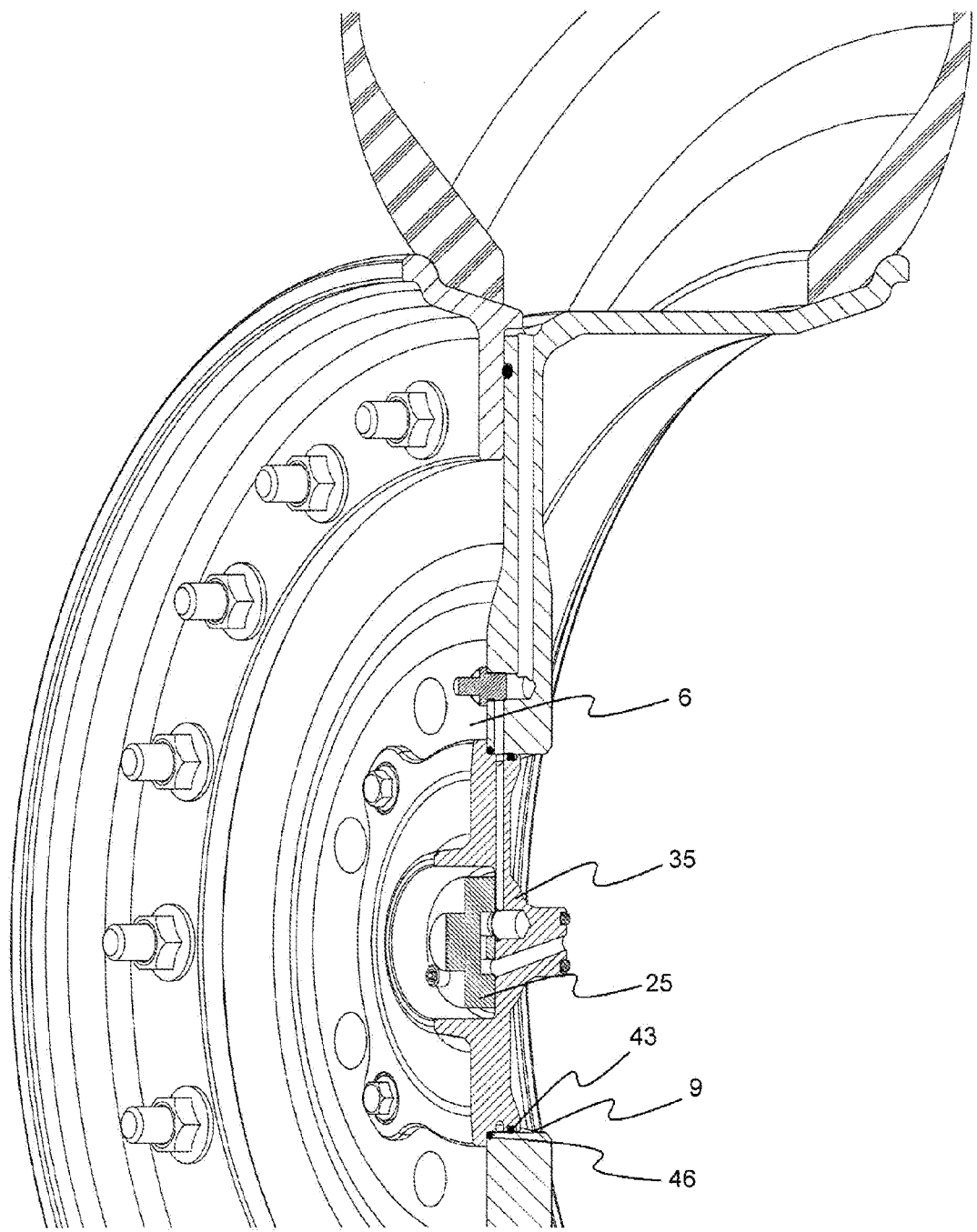
FIG. 7 provides a perspective view of a section of a two piece wheel illustrating an alternative method of seating the seals for the hub bore manifold.
Figure 8:
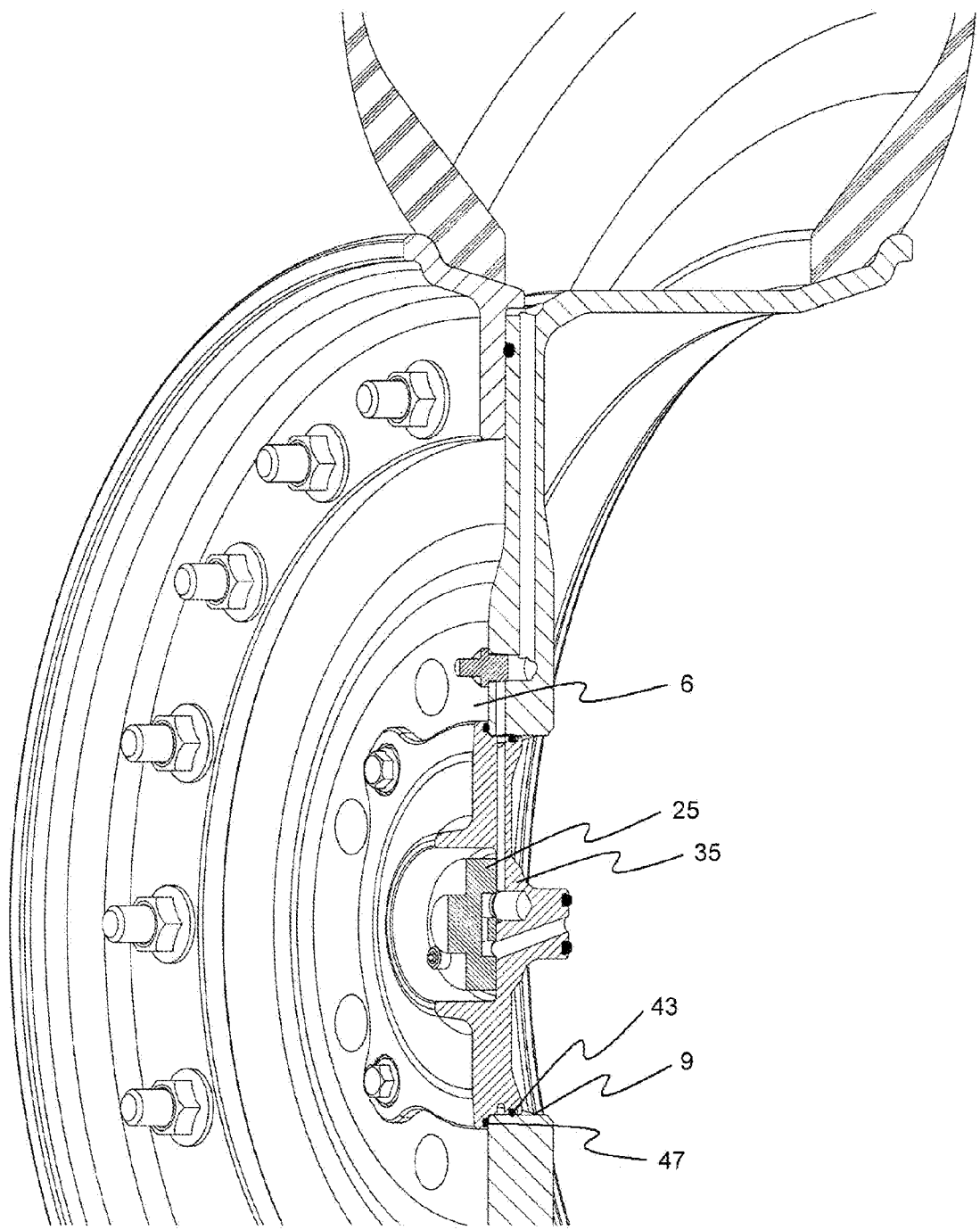
FIG. 8 provides a perspective view of a section of a two piece wheel illustrating another alternative method of seating the seals for the hub bore manifold.
Figure 9:
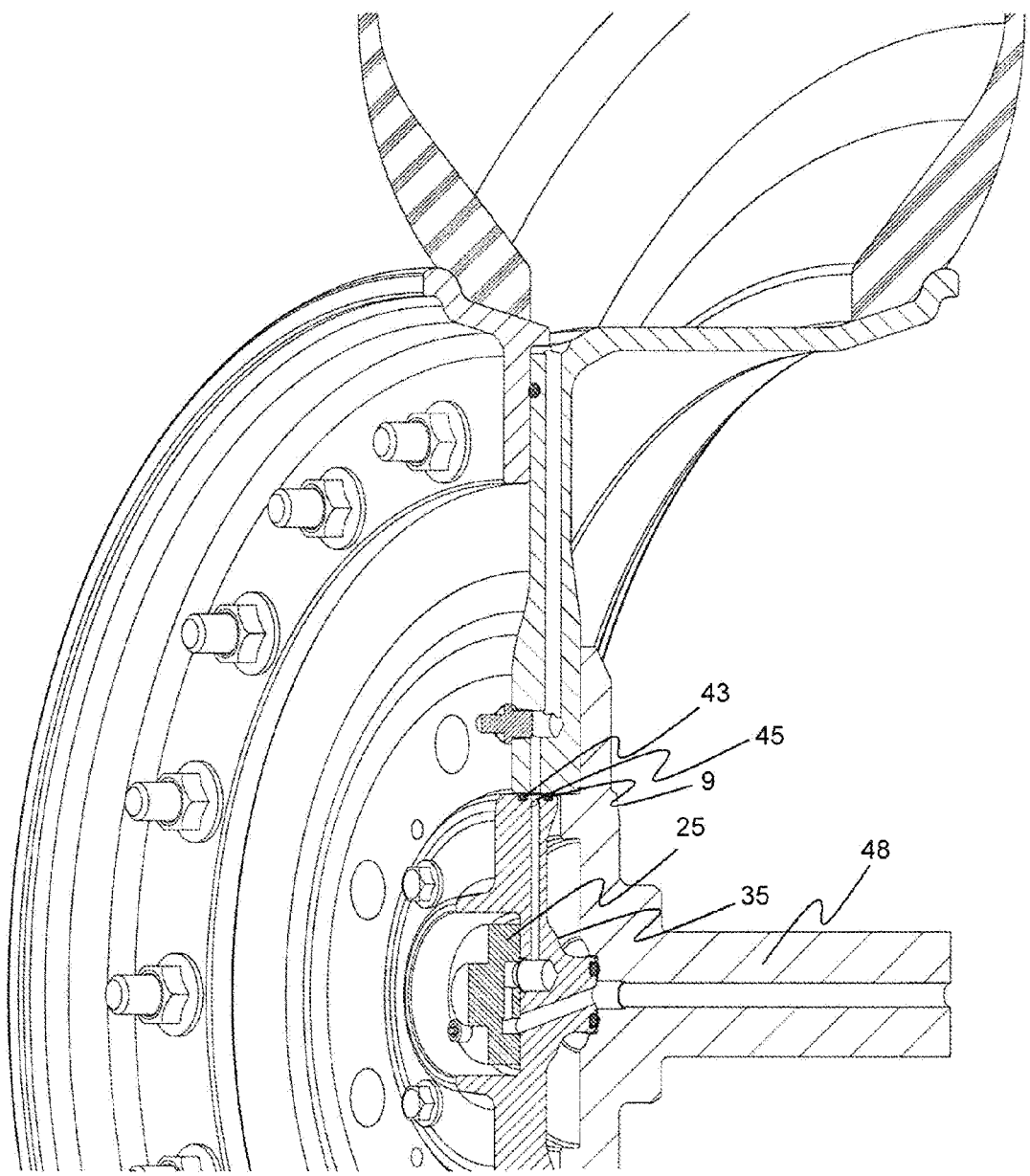
FIG. 9 provides a perspective view of a section of a two piece wheel illustrating a hub bore manifold attached directly to a vehicle hub.

Other means of attachment/sealing can be employed in attaching and/or sealing the hub bore manifold to the wheel without deviating from the spirit of the invention. This includes, but is not limited to, the use of threaded fasteners, retaining rings or locking mechanisms. Thus, FIG. 7 shows an o-ring 46 that seals on a chamfer on the face of the wheel disc 6 and hub bore 9 (instead of O-ring 44 shown in FIG. 5). Alternatively, FIG. 8 shows an o-ring 47 that seals on the face of the wheel disc 6. Even more distinctively, FIG. 9 shows the hub bore manifold 35 directly to the vehicle hub (not shown) rather than to the wheel disc 6 (as in prior figures), allowing for the removal of the wheel assembly without removing the CTI valve 25 or hub bore manifold 35.

Finally, although two-piece wheels 24 are shown in FIGS. 5, 7, 8 and 9, it is obvious that a hub bore manifold 35 and CTI valve 25 can be placed onto or into a one-piece, three-piece or multi-piece wheel as well. Moreover, though FIG. 5 shows a hub bore manifold 35 sealing air between the vehicle hub 48 and the wheel hub bore 9 by means of o-rings 43 and 44, other means of sealing the hub bore manifold 35 can be used without effecting the invention. A few examples are gaskets, thread sealers, tapered threads, or any other means.

From the foregoing, it will be appreciated that numerous variations are possible without exceeding the scope of the inventive concept set forth herein. For example, several of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the claims.

PARTS LIST

1 One-Piece Wheel Assembly
2 Hose Fitting (Hub to Hose)

3 One-Piece Wheel
4 Tire
5 Rim Portion of Wheel
6 Disc Portion of Wheel
7 Drop Center Area of Wheel
8 Airway to Tire (from Fitting to the Tire Cavity)
9 Hub Bore Area of Wheel
10 Air Hose (Fitting to Fitting)
11 Hose Fitting (Hose to Wheel)
12 Tire Air Chamber
13 Two-Piece Wheel Assembly Configured for "External" CTI Valve
14 Quick Release Valve
15 External CTI Valve
16 Two-Piece Wheel
17 Rim Flat Area of Wheel
18 Beadlock
19 Inner Rim
20 Outer Rim
21 O-Ring (for Wheel Rims)
22 Assembly Bolt
23 Assembly Nut
24 Two-Piece Wheel Assembly Configured for an Integrated CTI Valve
25 Integrated CTI Valve
26 Airway in Wheel From Hub to CTI Valve
27 Airway in Wheel From CTI Valve to Tire Cavity
28 Hose Fitting (Hub to Hose, External CTI Setup)
29 CTI Air Hose (Hub to CTI Valve, External)
30 CTI Air Hose (CTI Valve to Quick Release Valve, External)
31 CTI Air Hose (Quick Release Valve to Wheel Fitting, External)
32 Hose Fitting (Hose to Wheel, External)
33 CTI Valve Protection Cover
34 Two-Piece Wheel Assembly Configured for Hub Mounted Integrated CTI Valve
35 Hub Bore Manifold for CTI Valve
36 CTI Valve body/casing
37 CTI Valve Diaphragm
38 Tire-Side Port on CTI Valve
39 CTI Spring
40 Hub-Side Port on CTI Valve
41 CTI Valve Chamber
42 O-Ring-Face
43 O-Ring-Radial
44 O-Ring-Radial
45 Circumferential Groove/Channel
46 O-Ring-Chamber
47 O-Ring-Face
48 Vehicle Hub
49 Hub Port Air Passageway
50 Air Duct Connecting Internal Air Passageway
51 Hub Port Connecting Internal Air Passageway

What is claimed is:

1. A central tire inflation system, comprising:
a central tire inflation valve; and
a hub bore manifold connected to and surrounding the central tire inflation valve, wherein the hub bore manifold:
defines first and second air passageways in communication with the central tire inflation valve, wherein an end of the first air passageway is adjacent a first port of the central tire inflation valve and an end of the second air passageway is adjacent a second port of the central tire inflation valve;
is configured for removable connection to a hub of a vehicle; and
is configured to fit within a central opening of a wheel of the vehicle.

2. The system of claim 1, wherein the first air passageway is in communication with the second air passageway by way of the central tire inflation valve.

3. The system of claim 1, wherein the first air passageway is in communication with an air passageway defined by the vehicle hub if the hub bore manifold is connected to the vehicle hub.

4. The system of claim 1, wherein the second air passageway is in communication with an air passageway defined by the wheel if the wheel is mounted to the vehicle hub.

5. The system of claim 1, wherein:
the first air passageway is in communication with an air passageway defined by the vehicle hub if the hub bore manifold is connected to the vehicle hub; and
the second air passageway is in communication with an air passageway defined by the wheel if the wheel is mounted to the vehicle hub.

6. The system of claim 1, wherein the hub bore manifold has a substantially circular perimeter.

7. The system of claim 1, wherein the hub bore manifold defines a groove along a periphery of the hub bore manifold.

8. The system of claim 1, further comprising at least one sealing member positioned against the hub bore manifold.

9. The system of claim 1, further comprising the wheel, wherein the central opening of the wheel surrounds the hub bore manifold.

10. The system of claim 9, wherein the wheel defines a groove along a periphery of the central opening.

11. The system of claim 9, wherein the air passageway defined by the wheel is in communication with an interior of a tire if the tire is mounted on the wheel.

12. A central tire inflation system, comprising:
a central tire inflation valve;
a hub bore manifold connected to and surrounding the central tire inflation valve, wherein the hub bore manifold defines first and second air passageways in communication with the central tire inflation valve, wherein an end of the first air passageway is adjacent a first port of the central tire inflation valve and an end of the second air passageway is adjacent a second port of the central tire inflation valve; and
a wheel connected to the hub bore manifold, wherein the wheel defines a third air passageway, wherein the third air passageway is in communication with the second air passageway.

13. The central tire inflation system of claim 12, wherein the first air passageway is in communication with the second air passageway by way of the central tire inflation valve.

14. The system of claim 12, wherein the first air passageway is in communication with an air passageway defined by a vehicle hub if the wheel is connected to the vehicle hub.

15. The system of claim 12, wherein the hub bore manifold defines a groove along a periphery of the hub bore manifold.

16. The system of claim 12, wherein the hub bore manifold is surrounded by a central opening defined by the wheel.

17. The system of claim 12, wherein the wheel is removably connected to the hub bore manifold.

18. The system of claim 12, wherein the wheel defines a groove along a periphery of a central opening defined by the wheel.

19. The system of claim 12, wherein the third air passageway is in communication with an interior of a tire if the tire is mounted on the wheel.

20. The system of claim 12, further comprising at least one sealing member positioned against the hub bore manifold.

* * * * *